United States Patent [19]

Corsetti

[11] E Patent Number: Re. 33,123

[45] Reissued Date of Patent: Dec. 5, 1989

[54] LAMP SOCKET

[75] Inventor: John A. Corsetti, Port St. Lucie, Fla.

[73] Assignee: Dennis L. Johnson, Jensen Beach, Fla.

[21] Appl. No.: 110,375

[22] Filed: Oct. 20, 1987

Related U.S. Patent Documents

Reissue of:

[64] Patent No.: 4,548,449
Issued: Oct. 22, 1985
Appl. No.: 567,186
Filed: Dec. 30, 1983

[51] Int. Cl.[4] ..... H01R 13/02

[52] U.S. Cl. ..... 439/628

[58] Field of Search ..... 439/253, 257, 628

[56] References Cited

U.S. PATENT DOCUMENTS

| | | |
|---|---|---|
| 796,922 | 8/1905 | Morgan . |
| 1,239,005 | 9/1917 | Harris et al. . |
| 1,314,008 | 8/1919 | McWilliams . |
| 1,522,204 | 1/1925 | O'Neil . |
| 2,066,144 | 12/1936 | Douglas . |
| 2,253,582 | 8/1941 | Richardson . |
| 2,394,468 | 2/1946 | Noel . |
| 2,565,492 | 8/1951 | French, Jr. . |
| 2,786,189 | 3/1957 | Sargis . |
| 2,788,501 | 4/1957 | Buquor et al. . |
| 3,040,285 | 6/1962 | Stanley . |
| 3,040,286 | 6/1962 | Heller et al. . |
| 3,915,536 | 10/1975 | Glantz . |
| 4,183,604 | 1/1980 | Tjornhom, Sr. . |

FOREIGN PATENT DOCUMENTS

| | | |
|---|---|---|
| 717199 | 4/1965 | Canada . |
| 1581014 | 9/1969 | European Pat. Off. . |

*Primary Examiner*—Joseph H. McGlynn
*Attorney, Agent, or Firm*—Merchant, Gould, Smith, Edell, Welter & Schmidt

[57] ABSTRACT

A lamp socket attachment to convert a conventional screw-type light bulb socket into a spring insert type socket comprises a hollow cylindrical member open at both ends made of electrically non-conductive material divided by a transverse partition into upper and lower cup-like compartments, a cylindrical plug made of electrically non-conductive material is fixed concentrically in the lower compartment, there is a bore centrally through the plug and the partition, a contact member made of electrically conductive material slides captive in the bore, the contact member being adjustable in length, and there is a conductor member made of electrically conductive material having a lower portion extending along the outside of the plug through the partition and an upper portion extending along the inside surface of the upper compartment, such conductor member being structured so its lower portion will engage the threads of a screw-type bulb socket when the plug is inserted into the bulb socket and its upper portion will engage the threads of a conventional screw base light bulb inserted into the upper compartment of the lamp socket attachment.

14 Claims, 2 Drawing Sheets

LAMP SOCKET

Matter enclosed in heavy brackets [ ] appears in the original patent but forms no part of this reissue specification; matter printed in italics indicates the additions made by reissue.

BACKGROUND OF THE INVENTION

1. Field of the Invention

This invention broadly concerns lamp sockets. More particularly, it relates to lamp socket attachments to convert conventional screw-type light bulb sockets into spring insert sockets.

2. Description of the Prior Art

Lamp socket attachments to convert conventional screw-type light bulb sockets into spring insert sockets in a variety styles have been known for many years. For example, a conversion lamp socket constructed to thread at one end into a screw-type bulb socket and operatively accept the screw base of a conventional light bulb in the other end without the necessity of screwing the bulb therein is disclosed in U.S. Pat. No. 2,253,582.

Several modifications of a similar style of conversion lamp socket are shown in U.S. Pat. No. 2,788,501.

Another form of snap-in electric plug and socket designed for use with light bulbs that have connection bases that are unthreaded is disclosed in U.S. Pat. No. 2,786,189.

The present invention concerns yet another type of lamp socket attachment that can be inserted into a screw-type bulb socket and convert it for use with conventional screw base light bulbs without requiring the bulb to be threaded into the socket, which new attachments offer some advantages as compared with prior known related devices.

OBJECTS

A prinicpal object of this invention is the provision of lamp socket attachments that can be inserted into a screw-type bulb socket and convert it for use with conventional screw base light bulbs without requiring the bulb to be threaded into the socket.

Further objects include the provision of:

1. Lamp socket attachments designed to assist elderly persons, people afflicted with arthritis and other persons of limited dexterity to change light bulbs.

2. Such socket attachments that are simple and durable in construction, reliable and efficient in use and inexpensive to make.

3. Such socket attachments that provide strong retension of light bulbs inserted in their unthreaded, bulb reception sections.

Other objects and further scope of applicability of the present invention will become apparent from the detailed description given hereinafter; it should be understood, however, that the detailed description, while indicating preferred embodiments of the invention, is given by way of illustration only, since various changes and modifications within the spirit and scope of the invention will become apparent to those skilled in the art from this detailed description.

SUMMARY OF THE INVENTION

The stated objects are accomplished via the present invention by the provision of lamp socket attachments that can convert a conventional screw-type light bulb socket into a spring insert type socket which comprise a hollow cylindrical member open at both ends made of electrically non-conductive material, a transverse partition made of electrically non-conductive material located in the member dividing it into upper and lower cup-like compartments, a cylindrical plug made of electrically non-conductive material fixed concentrically in the lower compartment, the length of the plug being slightly greater than the depth of the lower compartment, a bore centrally through the plug and the partition, a contact member made of electrically conductive material positioned in the bore and a conductor member made of electrically conductive material having a lower portion extending along the outside of the plug through the partition and an upper portion extending along the inside surface of the upper compartment, the conductor member being structured so the lower portion will engage the threads of the screw-type light bulb socket when the plug is inserted into the socket and the upper portion will engage the threads of a conventional screw base light bulb inserted into the upper compartment of the lamp socket attachment.

*In one embodiment the lamp socket retains a light bulb in a hollow cylinder open at one end and made of a non-conductive material. A non-conductive transverse partition seal the opposite end of the cylinder. A bore passes through the partition and captures a spiral spring which includes a threaded screw engaged therewith. The head of the screw is larger than the diameter of the bore, and the screw serves to allow electrical current to reach the bottom of a light bulb. A conductor member extends through the partition and along the inside of the cylinder and may be bowed to springably engage the threads of a light bulb and provide for an electrical contact with the side of bulb to complete an electrical circuit including said bulb.*

In a preferred embodiment, the contact member comprises a spiral spring, a first screw threaded into one end of the spring and a second screw threaded into its other end, the heads of the screws being larger than the diameter of the bore whereby the contact member is captive within the bore, the contact member being adjustable in length by threading the screws inwardly or outwardly of the spring.

Also in a preferred embodiment, there is screw means extending through the wall of the lower compartment for use in locking the attachment onto a screw-type light bulb socket into which the attachment is inserted, and the upper and lower portions of the conductor member are slightly bowed to provide a spring effect thereto to assist the engagement of the lower portion with the threads of the light bulb socket and the engagement of the upper portion with the threads of the light bulb.

In another embodiment, the cylindrical member, the partition and the plug are molded of plastic material, the conductor member is made of copper metal and the lower compartment has a plurality of lugs that project radially inwardly from the inside wall thereof adjacent its open end that serve to assist in holding the attachment onto a screw-type light bulb socket into which the attachment is inserted.

In a further embodiment, there is a second conductor member similar to the first conductor member diametrically positioned relative to the first conductor member.

In a still further embodiment, the upper compartment has a longitudinal groove in the inside wall thereof extending from the open end thereof a short distance down the inside wall, the groove serving to accommodate a lead bead present on the threaded bases of conventional screw-type light bulbs.

BRIEF DESCRIPTION OF THE DRAWINGS

A more complete understanding of the invention can be obtained by reference to the accompanying drawings in which.

DESCRIPTION OF THE PREFERRED EMBODIMENTS

Figure 1:
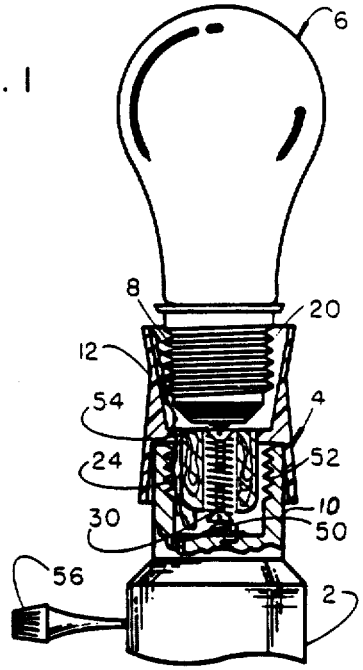
FIG. 1 is a lateral, partially fragmentary view of a lamp equipped with a lamp socket attachment of the invention.

Referring in detail to the drawings, the lamp 2 is equipped with a lamp socket attachment 4 of the invention whereby the light bulb 6 may be operatively installed in the lamp 2 without need to screw the threaded base 8 of the bulb 6 into the screw-type light bulb socket 10 of the lamp 2.

The socket attachment 4 comprises a hollow cylindrical member 12 open at the top end 14 and the bottom end 16. The member 12 is made of electrically non-conductive material, e.g., molded plastic, cast ceramic, etc.

A transverse partition 18, made of electrically non-conductive material, is located approximately at the middle of member 12 dividing it into upper cup-like compartment 20 and lower cup-like compartment 22.

The upper compartment 20 of the member 12 has a longitudinal groove 23 in the inside wall thereof extending from the open end 14 thereof down its inside wall. Such groove 23 serves to accommodate a lead bead (not shown) usually present on the threaded base 8 of conventional screw-type light bulbs.

A cylindrical plug 24, made of electrically non-conductive material, e.g., wood, plastic, ceramic, etc., is fixed concentrically in the lower compartment 22. The length of the plug 24 is slightly greater than the depth of said lower compartment 22 so that the bottom edge 26 of the plug 24 extends a short distance below the bottom end 16 of the member 12.

A bore 28 extends centrally through the plug 24 and the partition 18. A contact member 30 made of electrically conductive material, e.g., copper, brass, ferrous or other metal, is positioned and held captive in the bore 28. In a preferred embodiment of the invention, the contact member 30 comprises a spiral spring 32, a first screw 34 threaded into one end of the spring 32 and a second screw 36 threaded into its other end. The heads of the screws 34 and 36 are larger than the diameter of the bore 28 so the contact member 30 is captive within the bore 28. The contact member 30 is adjustable in length by threading the screws 34 and 36 inwardly or outwardly of the spring 32.

A first conductor member 38 made of electrically conductive material, e.g., copper, aluminum, or other metal, has a lower portion 40 extending along the outside of the plug 24 through the partition 18 and an upper portion 42 extending along the inside surface 44 of the upper compartment 20. The conductor member 38 is structured so its lower portion 40 will engage the threads of the screw-type light bulb socket 10 when the plug 24 is inserted into the socket 10 and its upper portion 42 will engage the threads of the conventional screw base light bulb 6 inserted into the upper compartment 20 of the lamp socket attachment 4.

Screw means 46 extends through the wall of the lower compartment 22 for use in locking the attachment 4 onto a screw-type light bulb socket 10.

The upper portion 42 and lower portion 40 of the conductor member 38 are slightly bowed to provide a spring effect thereto to assist the engagement of the lower portion 40 with the threads of the light bulb socket 10 and the engagement of the upper portion 42 with the threads of the light bulb 6.

Figure 7:
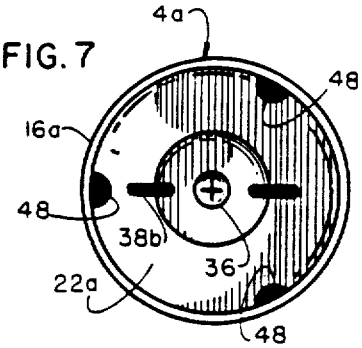
FIG. 7 is a bottom plan view of another embodiment of the lamp socket attachments of the invention.
Figure 2:
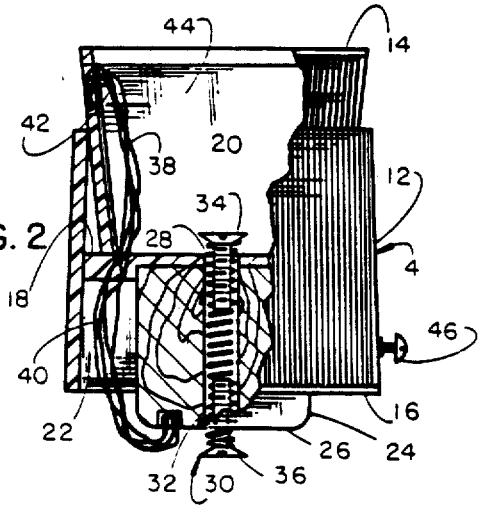
FIG. 2 is a fragmentary, lateral view of a lamp socket attachment of the invention.
Figure 3:
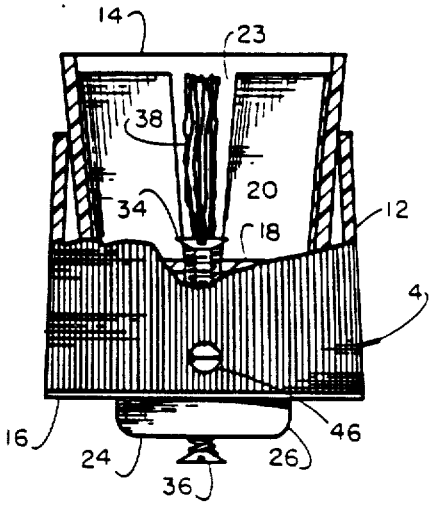
FIG. 3 is a fragmentary, lateral view of a lamp socket attachment of the invention viewed 90° from the view in FIG. 2.
Figure 4:
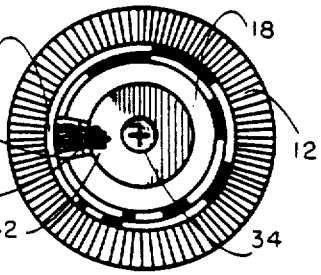
FIG. 4 is a top plan view of the lamp socket attachment of FIG. 2.
Figure 5:
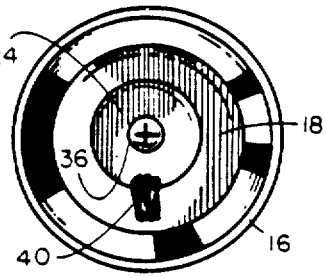
FIG. 5 is a bottom plan view of the lamp socket attachment of FIG. 2.

In the embodiment of the new socket attachment 4a of the invention as shown in FIG. 7, the lower compartment 22a has a plurality of lugs 48 that project radially inwardly from the inside wall thereof adjacent its open end 16a to assist in holding the attachment 4 onto the screw-type light bulb socket 10.

Figure 6:
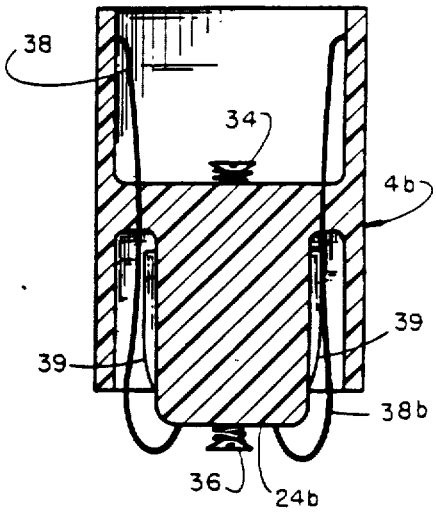
FIG. 6 is a lateral, sectional view of another form of lamp socket attachment of the invention.

In the embodiment shown in FIG. 6, the attachment 4b has a second conductor member 38b, similar to the first conductor member 38, diametrically, positioned relative to the first conductor member 38. This arrangement of two opposed conductor members helps to center the attachment 4 in the lamp socket 10.

Another feature of the embodiment shown in FIG. 6, is the provision of a pair of diametrically opposed ribs 39 positioned behind the conductor members 38b. The ribs 39 serve to insure that the members 38b will make good contact with the screw socket of any lamp into which the attachment 4b may be installed.

The new socket attachments 4 (or 4a, 4b) of the invention are easy to use to convert a screw-type lamp socket into a spring insert type. Thus, the user simply places the open end 16 of the attachment 4 over the top end of the lamp socket 10 and pushes it down until the bottom end of the contact member 30 engages the center electrical contact 50 of the lamp socket 10. As previously indicated, in the preferred embodiments, the length of the contact member 30 may be adjusted to accommodate lamp sockets of different depths. Also, the spring 32 helps to ensure good electrical connection between the member 30 and the contact 50. At the same time, the spring-like action of the bowed conductor member portion 40 ensures good electrical connection between the member 38 and the threaded inner surface 52 of the lamp socket 10.

With the socket attachment thus installed in the lamp 2, placement and replacement of bulbs 6 in the lamp 2 can be accomplished quickly without need to screw or unscrew the threaded base 8 of the bulb 6. Thus, the bulb 6 is simply forced into the upper compartments 20 of the member 12. This causes the threaded side of the bulb base 8 to electrically connect to the upper portion 42 of the conductor 38. At the same time, the center contact 54 of the bulb base 8 makes electrical connection with the top end of the contact member 30 whereby the bulb 6 can be energized by operation of the lamp switch 56.

Figure 8:
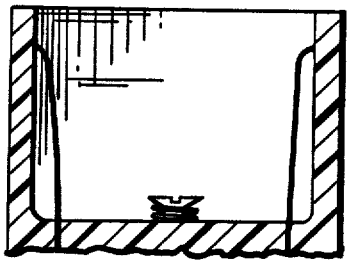
*FIG. 8 is a partial lateral, sectional view of the lamp socket of the invention on an enlarged scale.*
Figure 9:
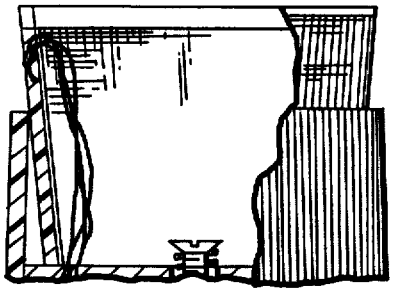
*FIG. 9 is a partial fragmentary lateral view of the another form of lamp socket of the invention on an enlarged scale.*

*FIGS. 8 and 9 show the structure for retaining screw-type light bulbs. This structure includes a lamp socket which retains a light bulb 6 in a hollow cylinder open at one end and made of a non-conductive material. A non-conductive transverse partition seals the opposite end of the cylinder. A bore passes through the partition and captures a spiral spring which includes a threaded screw 34 engaged therewith. The head of the screw is larger than the diameter of the bore, and the screw serves to allow electrical current to reach the bottom of a light bulb. A conductor member 38 extends through the partition and along the inside of the cylinder and may be bowed to springably engage the threads of a light bulb and provide for a electrical contact with the side of bulb to complete an electrical circuit including said bulb.*

The embodiments of the invention in which an exclusive property or privilege is claimed are defined as follows:

1. A lamp socket attachment to convert a conventional screw-type light bulb socket into a spring insert type socket which attachment comprises:

a hollow cylindrical member open at both ends made of electrically non-conductive material, a transverse partition made of electrically non-conductive material located approximately at the middle of said member dividing it into upper and lower cup-like compartments, a cylindrical plug made of electrically non-conductive material fixed concentrically in said lower compartment, the length of said plug being slightly greater than the depth of said plug being slightly greater than the depth of said lower compartment, a bore centrally through said plug and said partition, a contact member made of electrically conductive material positioned in said bore, said contact member comprising a spiral spring, a first screw threaded into one end of said spring and a second screw threaded into its other end, the heads of said screws being larger than the diameter of said bore whereby said contact member is captive within said bore, said contact member being adjustable in length by threading said screws inwardly or outwardly of said spring., a first conductor member made of electrically conductive material having a lower portion extending along the outside of said plug through said partition and an upper portion extending along the inside surface of said upper compartment, said conductor member being structured so said lower portion will engage the threads of said screw-type light bulb socket when said plug is inserted into said socket and said upper portion will engage the threads of a conventional screw base light bulb inserted into said upper compartment of said lamp socket attachment.

2. The attachment of claim 1 having screw means extending through the wall of said lower compartment for use in locking said attachment onto a screw-type light bulb socket into which said attachment is inserted.

3. The attachment of claim 1 wherein said upper and lower portions of said conductor member are slightly bowed to provide a spring effect thereto to assist the engagement of said lower portion with the threads of said light bulb socket and the engagement of said upper portion with the threads of said light bulb.

4. The attachment of claim 1 wherein said cylindrical member, said transverse partition and said plug are molded of plastic material.

5. The attachment of claim 1 wherein said conductor member is made of copper metal.

6. The attachment of claim 1 wherein said lower compartment has a plurality of lugs that project radially inwardly from the inside wall thereof adjacent its open end that serve to assist in holding said attachment onto a screw-type light bulb socket into which said attachment is inserted.

7. The attachment of claim 1 comprising a second conductor member similar to said first conductor member diametrically positioned relative to said first conductor member.

8. The attachment of claim 1 wherein said upper compartment has a longitudinal groove in the inside wall thereof extending from the open end thereof a short distance down said inside wall, said groove serving to accommodate a lead bead present on the threaded base of conventional screw-type light bulbs.

*9. A spring insert lamp socket comprising:*

*a hollow cylindrical member open at one end thereof and made of electrically non-conductive material,*

*a transverse partition made of electrically non-conductive material located at the opposite end of said cylindrical member from said open end,*

*a bore centrally through said partition,*

*a contact member made of electrically conductive material positioned in said bore, said contact member including a spiral spring and a screw threaded into one end of said spring, spiral spring and a screw threaded into one end of said spring, the head of said screw being larger than the diameter of said bore whereby said contact member is captive and adjustable within said bore, and*

*a first conductor member made of electrically conductive material and extending through said partition and extending along the inside surface of said cylindrical member and structured to engage the threads of a conventional screw base light bulb inserted into said cylindrical member so as to allow electrical current to pass from the said contact member through the filament in said bulb and to said first conductor member.*

*10. The lamp socket of claim 8 wherein said conductor is bowes slightly to provide a spring effect to engage the threads of said light bulb.*

*11. The lamp socket of claim 9 wherein said cylindrical member and said transverse partition are molded of plastic.*

*12. The lamp socket of claim 9 wherein said conductor is made of copper.*

*13. The lamp socket of claim 9 further comprising a second conductor member similar to said first conductor member diametrically positioned relative to said first conductor member.*

*14. The lamp socket of claim 9 further comprising a longitudinal groove conformed in the inside wall of said cylindrical member and extending from the open end thereof a short distance down the inside wall, said grooves serving to accommodate a lead bead present on the threaded base of a conventional screw type light bulb.*

* * * * *

UNITED STATES PATENT AND TRADEMARK OFFICE

CERTIFICATE OF CORRECTION

PATENT NO. : Re. 33,123

DATED : December 5, 1989

INVENTOR(S) : John A. Corsetti

It is certified that error appears in the above-identified patent and that said Letters Patent is hereby corrected as shown below:

Col.1, line 18
after "variety" insert --of--

Col.1, line 40
"prinicpal" should be --principal--

Col.3, line 27
delete "the"

Col. 6, line 48
"8" should be --9--

Col. 6, line 49
"bowes" should be --bowed--

Signed and Sealed this

Fourth Day of December, 1990

*Attest:*

HARRY F. MANBECK, JR.

*Attesting Officer*

*Commissioner of Patents and Trademarks*